Oct. 2, 1951 R. W. METTLER 2,570,146
FOLDING BOX FORMING MACHINE
Filed Nov. 23, 1949 6 Sheets-Sheet 1
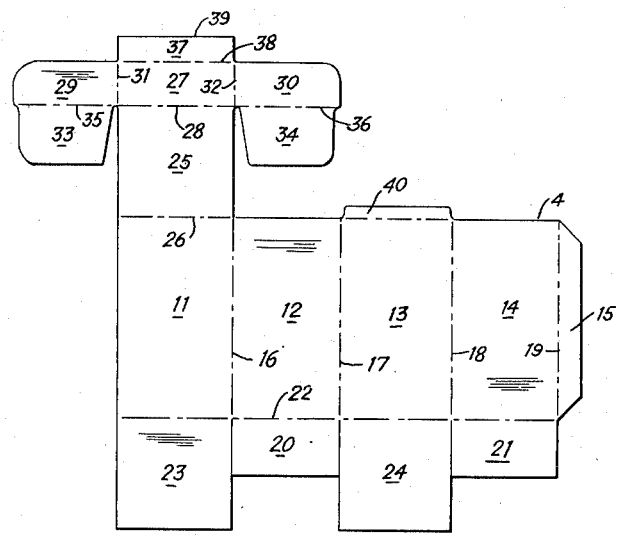
Fig. 1
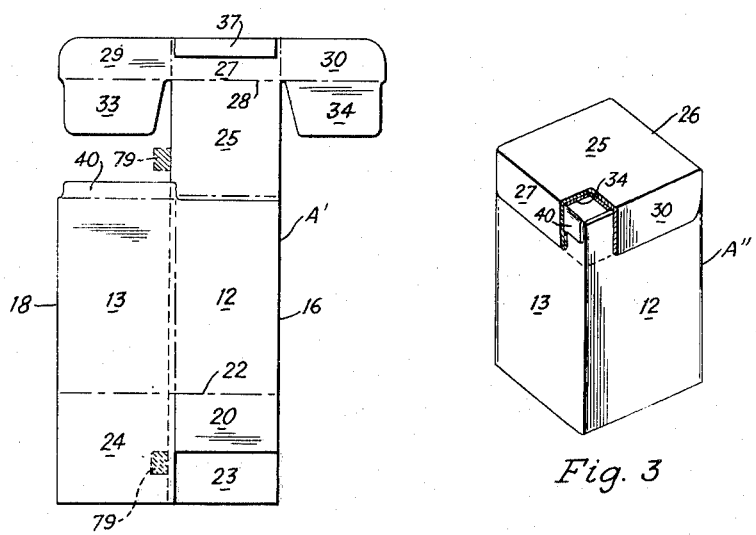
Fig. 2
Fig. 3
INVENTOR.
ROLLIN W. METTLER
BY
AUSTIN WILHELM+CARLSON
Howard G. Purcell
his ATTORNEYS INVENTOR.
ROLLIN W. METTLER
BY
AUSTIN WILHELM·CARLSON
Howard G. Russell
his ATTORNEYS

INVENTOR.
ROLLIN W. METTLER
BY
AUSTIN WILHEEM+CARLSON

Howard G. Russell
his ATTORNEYS

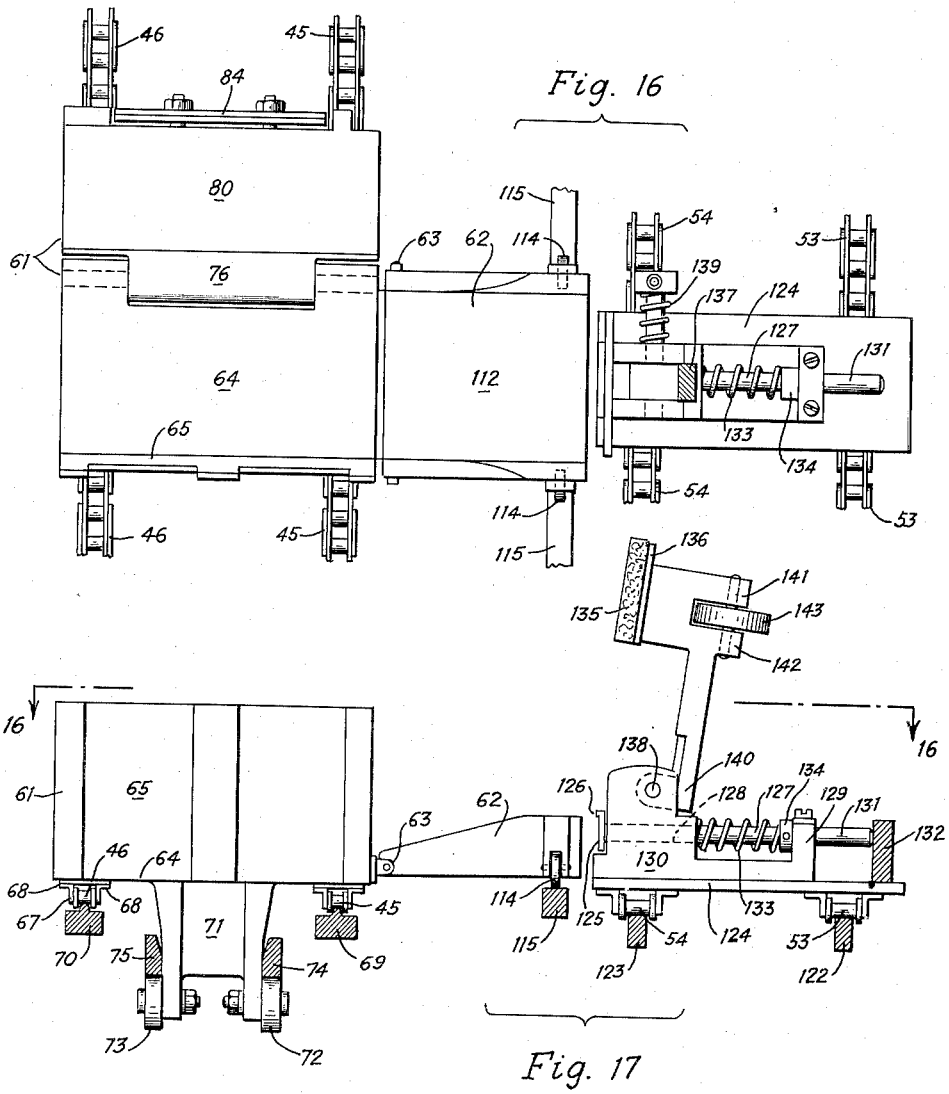

Oct. 2, 1951  R. W. METTLER  2,570,146
FOLDING BOX FORMING MACHINE
Filed Nov. 23, 1949  6 Sheets-Sheet 5

INVENTOR.
ROLLIN W. METTLER
BY
AUSTIN WILHELM+CARLSON
Howard G. Russell
his ATTORNEYS INVENTOR.
ROLLIN W. METTLER
BY
AUSTIN WILHELM + CARLSON
Howard G. Russell
his ATTORNEYS Patented Oct. 2, 1951

2,570,146

UNITED STATES PATENT OFFICE 2,570,146

FOLDING BOX FORMING MACHINE

Rollin W. Mettler, Hamden, Conn., assignor to National Folding Box Company, Inc., New Haven, Conn., a corporation of Connecticut Application November 23, 1949, Serial No. 128,964

5 Claims. (Cl. 93—49)

This invention relates to improvements in automatic machines for setting up folding boxes from flat box blanks and has particular application to machines for setting up hinge-cover boxes.

Hinge-cover boxes requires very precise assembly of the body and cover portions of the box, since the accurate fit of the cover depends on the accuracy with which the box body and the box cover are formed. This applies particularly to hinge-cover boxes of the reclosable type having automatic means for maintaining the box cover in closed position. Such locking means commonly include a pair of locking elements on the box cover and on the box body, respectively, one of these elements generally being a hinged flap having an abutment edge, the other element being an edge of a glued-down flap capable of engaging the abutment edge of the hinged flap in edge-to-edge position. The locking elements permit opening of the cover by application of a certain amount of force which causes flexing of the lock flap within the limits of resiliency. Upon reclosing of the cover the locking elements automatically snap into engagement.

The permissible tolerances in the box dimensions of such reclosable hinge-cover boxes are small, and it is therefore essential to have a machine capable of forming both the box body and the box cover with great and constant accuracy, if waste is to be avoided.

It is manifest that in machines of this type the timing of the various box forming elements is critical and that even slight mistiming or maladjustment results in a misshapen box. Such mistiming or maladjustment may be the result of natural wear of parts, it may be the result of accidental jamming of blanks in the machine. If, after the clearing up of a jam, it is discovered that the adjustment of the machine was disturbed, a considerable number of blanks have passed through or into the machine, all of which are irregular in shape and must be discarded.

The present invention eliminates such waste and disturbance by providing mechanism for squaring the blanks and associated mechanism for forming the box cover, the mechanisms being entirely independent of the rate of travel, or the position of any particular elements on the blank carrying conveyor with respect to fixed or independently operated and timed members. More particularly, the conveyor assembly which moves the box blanks through the machine is so constructed that it accurately squares the blanks and forms the covers by means of self contained mechanism, independent of the rate of advance of the conveyor, and independent of the operation of the feeding mechanism which feeds blanks into the machine.

This invention relates more particularly to machines of the type disclosed in my earlier application Serial Number 104,432 filed July 13, 1949 and provides specific improvements which increase the accuracy of assembly of boxes, minimize the influence of wear of parts, particularly of conveyors, on the accuracy of assembly, and permit still greater assembly speeds and the successful handling of particularly large box blanks.

Among other features this invention provides an improved mechanism for setting up the box body portion and the box cover portion of a blank jointly in a way to make the accuracy of assembly independent from tolerances or wear of conveyors.

More particularly the invention provides a composite box shaping assembly or jig which is carried by one and the same conveyor chain. The jig is so constructed that all its movable portions which fold the various box panels and flaps into set up position are accurately and permanently associated with one another so that neither the timing of several conveyors nor the wear of, or tolerances in, the conveyor affect the accuracy with which the box is formed.

The various objects, features, and advantages of the invention will appear more fully from the detailed description which follows accompanied by drawings showing, for the purpose of illustration, essential portions of a box machine embodying the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming part of it in which:

Figure 1 is a flat, cut and scored blank of a reclosable hinge-cover box, the blank being shown in plan view, as it appears after cutting from a larger sheet of paperboard;

Figure 2 is a plan view of the blank of Figure 1 after initial folding and gluing operations resulting in a tubular flat collapsed blank ready for feeding into a box forming machine;

Figure 3 is a perspective view, partly in section, of the completed hinge-cover box made from the blank of Figure 2;

Figure 16 is a plan view of the jig with one of its side portions folded down, a part being broken away at line XVI—XVI of Figure 17;

Figure 17 is an elevational front view of the assembly shown in Figure 16;

Figure 4:
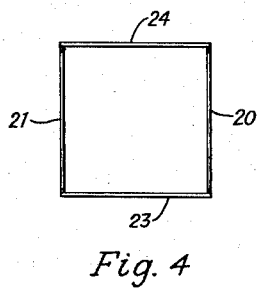
Figures 4 to 11 are diagrammatic illustrations of successive steps in forming and sealing the bottom end of the box.
Figure 5:
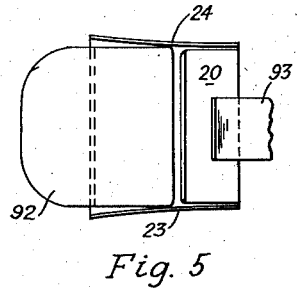
Figure 6:
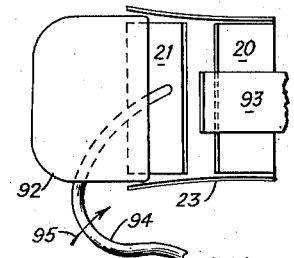
Figure 7:
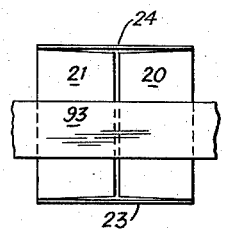
Figure 8:
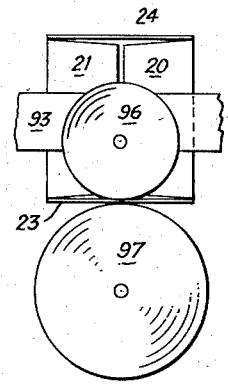
Figure 9:
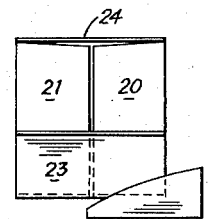

In the following description and in the claims, various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the broad principles of the invention and that the invention may be applied to structures other than the ones shown.

The blank A shown in Figure 1 comprises side wall panels 11, 12, 13 and 14 and a terminal glue lap 15 hingedly connected along side fold lines 16, 17, 18 and 19. Bottom flaps 20 and 21 are hingedly connected to the side wall panels 12 and 14, respectively, along a bottom fold line 22, and bottom panels 23, and 24 are hingedly connected to the side wall panels 11 and 12 along the same fold line 22.

The reclosable hinge-cover structure comprises a main cover panel 25 hingedly connected to the side wall panel 11 along a cover fold line 26. A cover front panel 27 is hinged to the main cover panel along a top fold line 28, and cover side panels 29 and 30 are hinged to the cover front panel along front fold lines 31 and 32, respectively. Glue flaps 33 and 34 are hinged to the cover side panels along side fold lines 35 and 36, respectively, and serve to connect the cover side panels to the main panel. An abutment flap 37 is connected to the cover front panel 27 along a fold line 38 and has an abutment or locking edge 39 whose purpose will presently appear.

A lock flap 40 is hingedly connected to the side wall panel 13 along a fold line 41. This lock flap is foldable back upon the side wall panel 13 and its terminal edge 42 is adapted to engage the locking edge 39 of the abutment flap 37 in edge-to-edge relation in the finished carton for the purpose of maintaining the cover locked.

The blank A is shown in the form in which it is cut from a large sheet or roll of foldable stock. It is ready for a preliminary folding and gluing operation which converts the flat blank into a tubular structure ready for setting up into hollow box form on an automatic box forming machine.

The blank A is converted into a tubular structure by applying adhesive to the glue lap 15 followed by folding of the blank at the fold lines 16 and 18. This brings the glue lap 15 into adhesive engagement with the side wall panel 11 and brings the side wall panels 12 and 13 into face-to-face contact with the side wall panels 11 and 14, respectively. Likewise, adhesive is supplied to the abutment flap 37 and the flap is folded over and adhered to the cover front panel 27. The resulting tubular blank A' is shown in Figure 2. It is ready for setting up into hollow box form.

Collapsed flat tubular blanks A' may be stored and shipped in flat condition requiring a minimum of space. They are immediately available for setting up into hollow box form on automatic machinery.

An understanding of the construction and operation of the automatic box forming machine about to be described will be facilitated by a brief consideration of the construction of the finished box A'' shown in Figure 3. The bottom of the box is formed by infolding of the bottom flaps 20 and 21 and by folding thereover the bottom panels 23 and 24, the flaps and panels being adhesively secured to one another.

The hinge cover comprises the main cover panel 25 to which the glue flaps 33 and 34 are adhesively secured, flap 34 being visible at the cutaway portion of the illustrated box. The cover front panel 27 with its abutment flap 37 overlies the lock flap 40 on the top portion of the wall panel 13, the lock flap 40 being downfolded to engage the abutment flap 37 with its free edge.

The hinge cover is opened by swinging it about its hinge line 26 against the resistance of the lock flap 34. The lock flap, together with the upper portion of the wall panel 13, resiliently flexes during the disengagement and returns immediately into operative locking position for relocking the hinge cover upon reclosing of the box.

Figure 20:
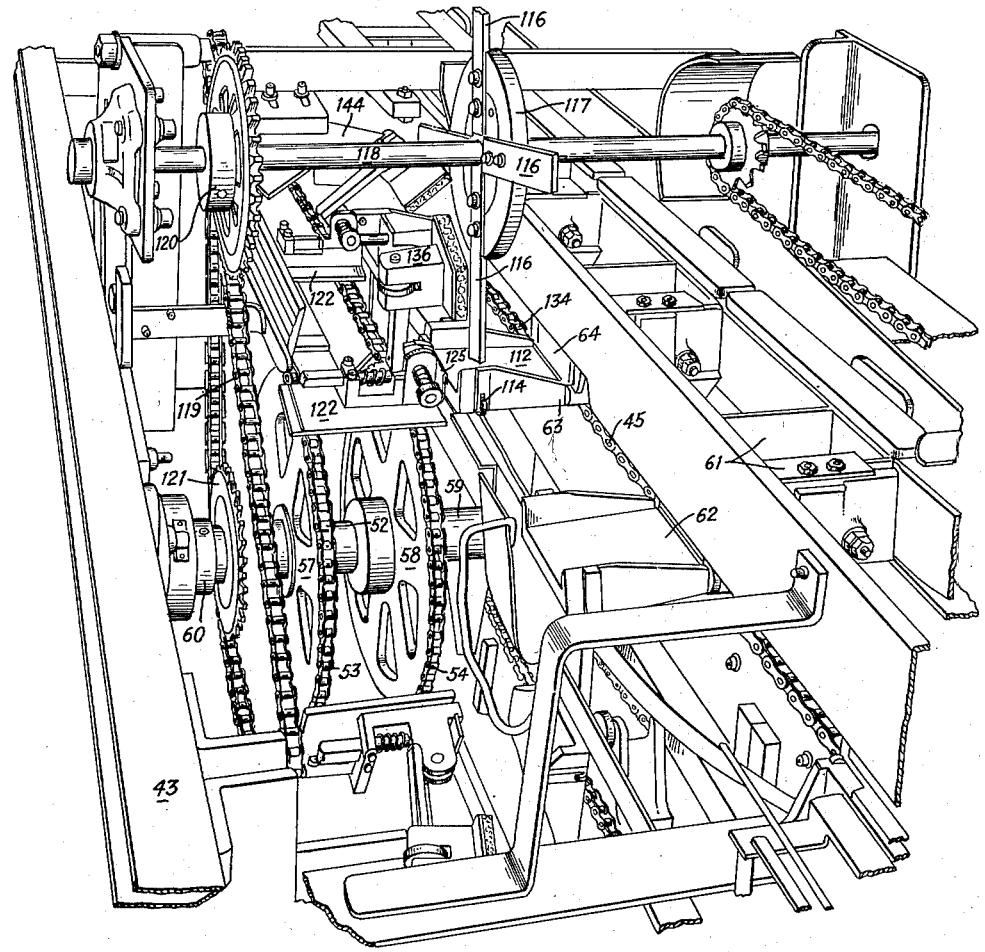
Figure 20 is a perspective view of a portion of the box forming machine in which the shaping of the box cover takes place, the elements of the jigs being in positions just prior to the position shown in Figure 18.
Figure 21:
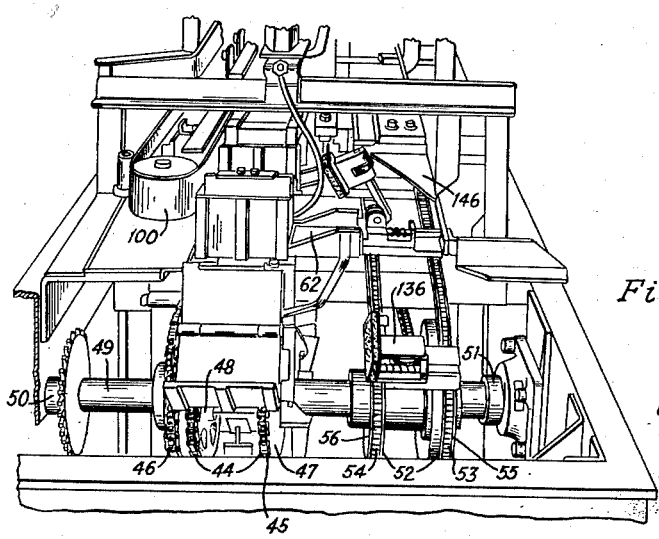
Figure 21 is a perspective view of the discharge end of the machine.

Referring now to the several illustrations of the box forming machine, particularly Figures 20 and 21, the machine comprises a machine base 43 upon which two main conveyors are mounted. A first conveyor 44 consists of a pair of endless chains 45 and 46 trained around gears near either end of the machine base, two gears 47 and 48 being visible in Figure 21. The gears 47 and 48 are on a common shaft 49 mounted in the machine base in bearings 50 and 51. A similar shaft and gears support the conveyor 44 at the other end of the machine base.

A second conveyor 52 comprises endless chains 53 and 54 trained around gears 55 and 56 on the common shaft 49. The conveyor 52 is shorter than the conveyor 44, and its other end is supported by chain gears 57 and 58 on a common shaft 59 mounted in the machine base in suitable bearings, one bearing being visible at 60.

Figure 14:
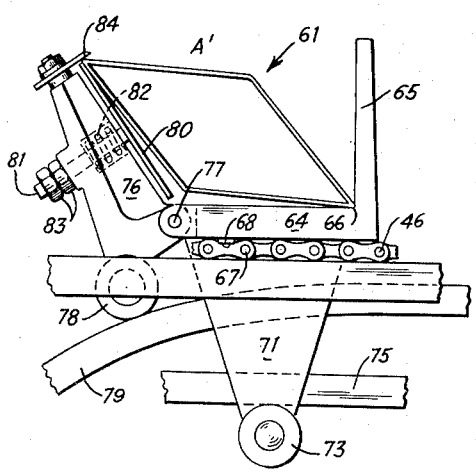
Figure 14 is an elevational end view of a jig illustrating the action of squaring the blank.
Figure 15:
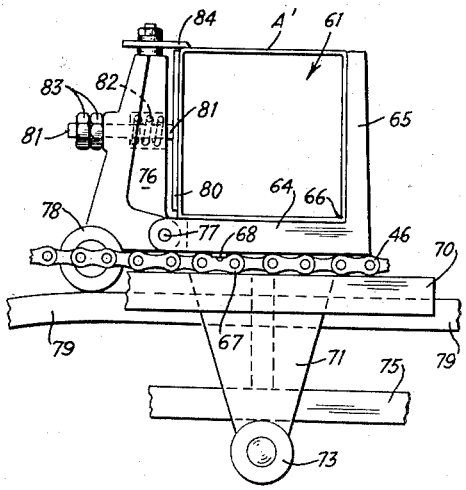
Figure 15 shows the jig of Figure 14 in the position in which the blank is squared.
Figure 18:
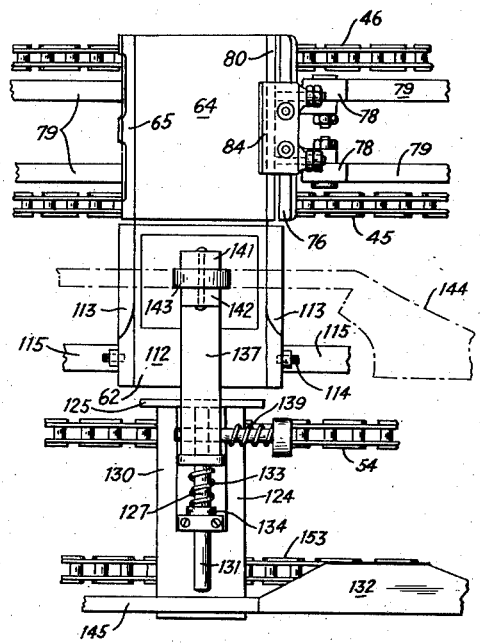
Figure 18 is a further plan view of the assembly of Figure 16 in the position in which the box is completed.

The chains 45 and 46 of the first conveyor carry a plurality of box blank shaping members or jigs which are shown in greater detail in Figures 14 and 18.

Each jig basically comprises a box body shaping member 61 and a box cover shaping member 62. The box cover shaping member 62 is hingedly connected to the box body shaping member 61 at a hinge axis 63.

The box body shaping member comprises a bottom portion 64 with which an upright side portion 65 is integral. The bottom portion 64 and the side portion 65 form an angle of 90 degrees between them at 66 and are secured to special links 67 of the conveyor 46 having upward extensions 68. In a similar manner the bottom portion 64 is connected to the other chain 45 and thus travels with the conveyor relatively to the machine base 43. The chains 45 and 46 ride on rails or tracks 69 and 70 on the machine base. The bottom portion 64 of the box body shaping member 61 carries a downward extension 71 bearing rollers 72 and 73 which engage the underside of rails or tracks 74 and 75 on the machine base 43. Thus the box body shaping member is positively guided against tilting of its angular portions 64 and 65, the arrangement being preferably such that the bottom portion 64 is horizontal while the side portion 65 is vertical during the major portion of travel from one end of the machine to the other.

A tiltable side portion 76 is hingedly connected to the bottom portion 64 at 77. The tiltable side portion 76 carries a pair of rollers 78 running on tracks 79 which, by their curvature, determine the angular position of the side portions 76 with respect to the bottom portion 64.

The side portion 76 carries a pressure plate 80 mounted on a pair of studs 81 slidable in the body of the side portion 76 and is biased towards the fixed side portion 65 by compression springs 82. Nuts 83 permit adjustment of the spacing between the pressure plate 80 and the side portion 65. This spacing is made equal to the outside width of the box body, that is the distance between the side walls 12 and 14 measured at the outside of the box.

A projection 84 extends from the top of the side portion 76 towards the fixed side portion 65. It is spaced from the bottom portion 64 a distance equal to the depth of the box, that is the distance between the walls 11 and 13 measured at the outside of the box. The projection 84 serves to grasp a flat blank and urges it towards the corner 66, thereby expanding the blank under the force exerted upon it as it is shown in Figure 14.

Figure 13:
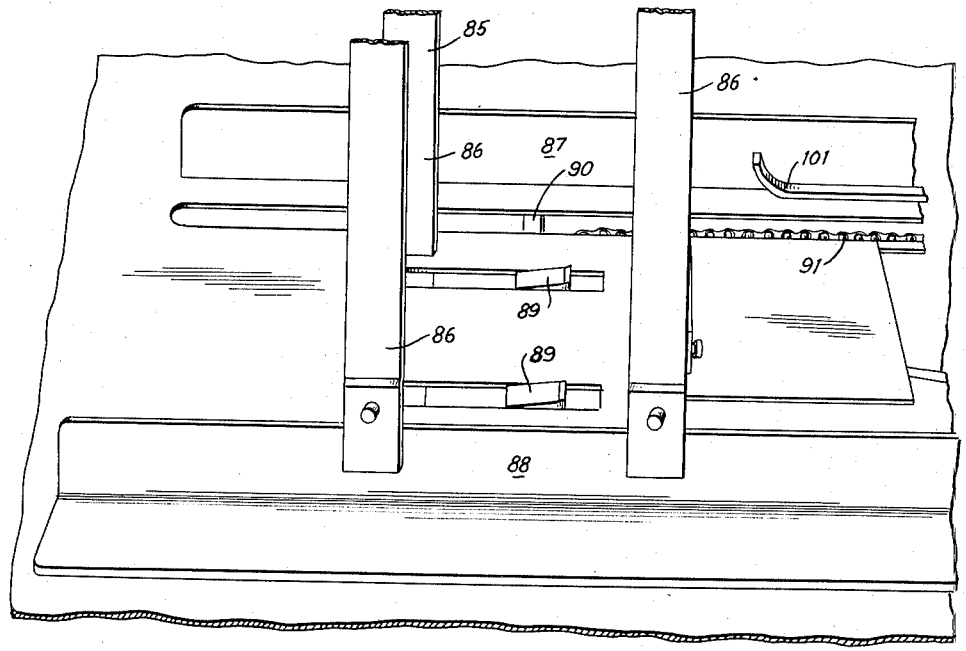
Figure 13 is a perspective view of a portion of the box forming machine comprising a magazine for blanks, feeder lugs and a feed conveyor for carrying blanks into the conveyor borne jigs.

As the box body shaping member passes over a curved portion of the track 79, the tiltable side portion 76 tilts back and opens the jig. Figure 16 shows the jig in open position in which the side portion 76 lies horizontal. In this position a flat blank may be inserted into the jig from a magazine 85 shown in greater detail in Figure 13.

The magazine comprises essentially four upright posts 86 of L-shaped cross section between which the blanks fit. Lateral guide rails 87 and 88 prevent the bottommost blank from moving sideways after the blank has left the magazine space proper. Reciprocating fingers 89 advance the bottommost blank into the path of feed lugs 90 on a feed conveyor consisting of two chains, one chain being visible at 91. The feed conveyor moves the flat collapsed blank between the guide rails 87 and 88 and underneath a top rail 101 towards the first conveyor and into an open jig 61 where the blank is then grasped by the projection 84 and expanded into square shape as illustrated in Figure 14. The side portions 65 and 76 maintain the box walls accurately squared for performance of the bottom closing and sealing operations which will now be described, reference being made to Figures 4 to 12.

As the squared blank moves through the machine, its end panels 23 and 24 are first engaged by a stationary spreader 92 which spreads the end panels apart and out of the way of the end flaps 20 and 21. While the end panels 23 and 24 are still engaged by the spreader, the leading end flap 20 strikes a stationary sweep 93 which folds the end flap 20 into a position at right angles with respect to the box side walls. Substantially simultaneously, the trailing bottom flap 21 is engaged by the arm of an oscillating kicker 94. The kicker 94 is mounted on the machine base 43 and is periodically operated in the direction of the arrow 95 when a jig passes by. The kicker moves in a clockwise sense and folds the bottom flap 21 into a position substantially at right angles with respect to the box side walls. The infolded trailing bottom flap 21 then comes within the reach of the stationary sweep 93 and is maintained in infolded position while the kicker returns to its rest position in a counter-clock-wise sense. In its rest position the kicker arm 94 is out of the way of the bottom panel 23 of the succeeding box blank which passes over the kicker freely.

Figure 10:
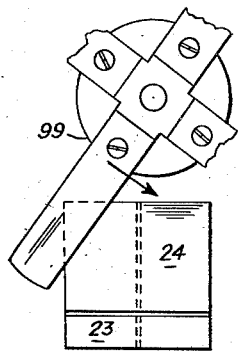
Figure 11:
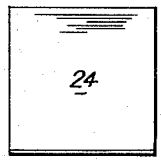
Figure 12:
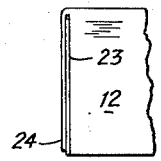
Figure 12 is a side view of the sealed box end shown in Figure 11.

While the inner end flaps 20 and 21 are still engaged by a sweep 93, the inner bottom panel 23 moves past a pair of glue wheels 96 and 97 (Figure 8) which apply adhesive to both sides of the bottom panel 23. The bottom panel 23 then moves within the reach of a stationary plow 98 which folds the bottom panel into upright position against the infolded bottom flaps 20 and 21. Immediately thereafter a rotary sweep 99 engages the outer end panel 24 and folds it into bottom closing position as shown in Figures 10 and 11.

The folded bottom structure is then engaged by a pressure belt 100 (Figure 21) which travels at the same rate as the conveyor 44 and maintains gentle pressure on the outer bottom panel 24 for a time sufficient to permit the adhesive to set.

The sealed bottom maintains the box squared when it is discharged at the end of the conveyor 44. As the conveyor chains 45 and 46 travel over the chain gears 47 and 48, the box body shaping members open and the glued boxes drop out.

Figure 19:
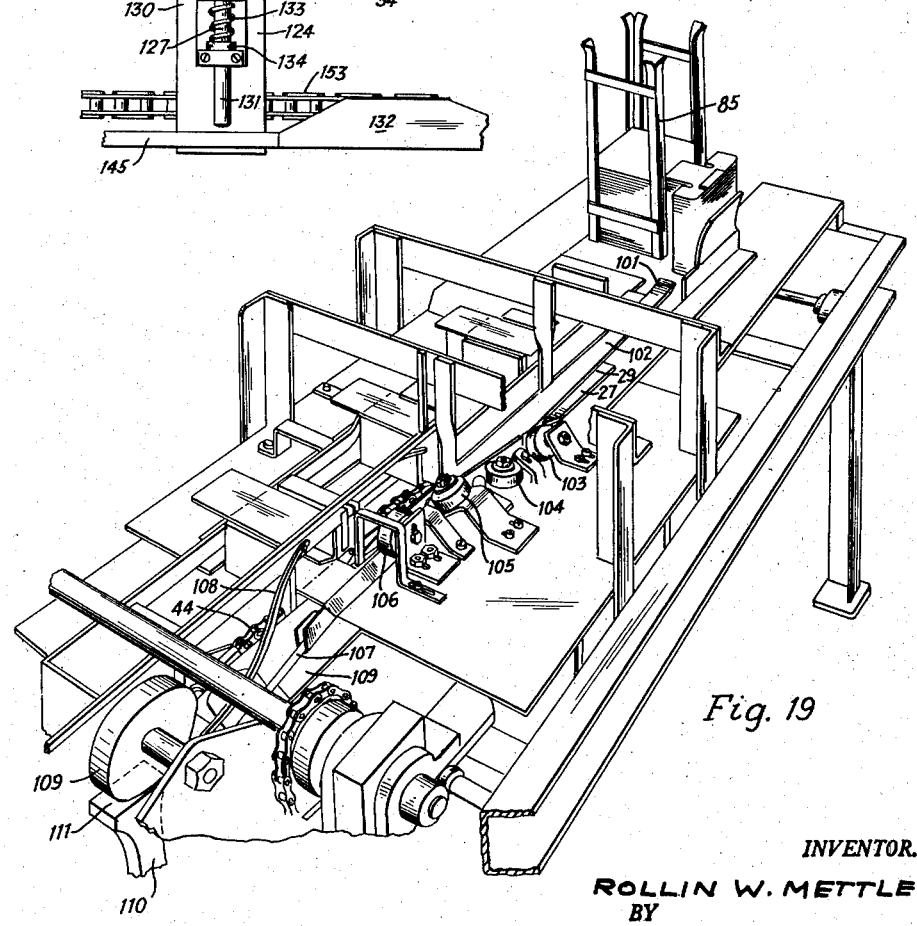
Figure 19 is a perspective view of a section of the machine for pre-folding the cover panels and flaps and applying adhesive thereto.

Turning now to mechanisms and operations for setting up the hinge cover, the cover panels and flaps of the blank leaving the magazine 85 are first engaged by a rail 101 of substantially L-shaped cross section (Figure 19) whose horizontal portion 102 serves as a sword. The flaps 29, 27 and 30 protrude beyond the sword 102 and are folded over it by a series of folding members which include four rollers 103, 104, 105 and 106. The axis of the first roller 103 lies at an angle of substantially 45 degrees with respect to the horizontal, the axis of the second roller 104 is vertical, the axis of the third roller is inclined substantially 45 degrees with respect to the axis of the second roller, and the axis of the last roller 106 is horizontal. A further roller having a horizontal axis lies underneath the roller 106 to form a nip with roller 106 through which the folded cover assembly passes. This last mentioned roller is not visible in Figure 19 since a folded blank lies directly above it.

The folded flap and panel assembly of the box blank then moves within the reach of a bar 107 diverging slightly with respect to the path of the conveyor 44. The bar 107 unfolds the panels and flaps leaving the nip of the rollers and near its end portion engages the panels 29, 27 and 30 with the result that the flaps 33 and 34 tend to rise due to the previous folding of the stock. Momentarily, however, the flaps 33 and 34 are prevented from doing so by a downwardly extending hold-down bar 108 which guides the flaps underneath an upper pressure roller 109 of a glue applicator whose lower portion comprises spaced cylindrical surfaces 111 of a spot glue wheel 110. The wheel 110 is so timed with respect to the conveyor 44 that its spaced cylindrical surfaces 111 apply adhesive to the two glue flaps 33 and 34, but not to the main cover panel 25.

As soon as the flaps 33 and 34 emerge from underneath the pressure roller 109 they rise up, thus preventing the adhesive on the flaps from soiling the machine bed over which they move.

The hinged cover portion of the blank is set up by a mechanism which will now be described.

The cover shaping device 62 comprises a base portion 112 from which upright side portions 113 extend. The base portion is hingedly connected to the bottom portion 64 whereby correct alignment is insured of its side portions 113 with respect to the upright members 65 and 80 of the box body shaping assembly.

The base portion 112 carries rollers 114 running on a track 115 on the machine base. This track is curved to control the inclination of the cover shaping member 62 with respect to the box body shaping member 61.

As is seen in Figure 20, the box cover shaping member first assumes a substantially vertical position as the conveyor chain 45 moves from the magazine end of the machine towards the discharge end of the machine. The rollers 114 of the box cover shaping device then engage the track 115 which curves upwardly and causes the base portion 112 together with its side portions 113 to swing upwardly into a horizontal position underneath the cover portion of the blank which is flat except for the pre-breaking at the fold lines 35, 28, 36. The application of adhesive to the glue flaps 33 and 34 was previously described. As the box cover shaping member 62 rises, the inner surfaces of its side portions 113 are in line with the front fold lines 31 and 32 of the blank. The cover portion of the blank is slightly folded upwardly about the fold line 26 as the cover shaping assembly 62 rises beneath it. Immediately thereafter, however, the main cover panel 25 is engaged and depressed by one of the arms 116 of a sprocket wheel 117. The sprocket wheel 117 is mounted on a shaft 118 driven by a chain 119 over chain gears 120 and 121 and moves in timed relationship with the conveyor chains 44, 45, 57 and 58. The arms 116 initiate the folding of the panels and flaps of the cover portion of the blank which is then completed by further folding devices which will now be described.

The conveyor chains 57 and 58 travel over supporting rails 122 and 123 and carry a plurality of supports 124 spaced evenly and equally as the box body shaping members on the conveyor 44.

Each support 124 carries a movable front member 125 adapted to engage the front panel 27 of the cover assembly. The front member 125 is essentially a plate having an overhanging top edge 126. The plate is mounted on a horizontal pin 127 slidable in bearings 128 and 129 of a base 130 on the support 124. The far end 131 of the pin is engageable by a flat cam 132 on the machine base 43. As the cover support 124 moves past the cam 132 the pin 131 strikes the rising cam surface and moves the front plate 125 towards the box cover shaping member 62 against the action of a restoring spring 133 bearing with one end against the base 130 and with the other against a collar 134 on the pin 131.

The cover shaping device includes further a pressure pad 135 of resilient material, for example sponge rubber, mounted on a pad base 136 on the end of an arm 137. The arm 137 is pivotally mounted at 138 in the base 130 and is biased toward a raised position by a torsion spring 139. The end 140 of the arm 137 provides a stop with which the arm rests against the base 130 in elevated position.

The pad base 136 has two lugs 141 and 142 between which a roller 143 is mounted. A leading plow 144 on the machine base 43 engages the roller 143 and causes the arm to swing down until the pressure pad 135 comes to rest against the base portion 112, or a blank on the base portion. The pressure pad is maintained in this position by a horizontal rail 145 on the machine base 43. A trailing plow 146 similar to the plow 144, but mounted at the end of the rail 145 permits the pressure pad 135 to return to its elevated position prior to discharge of the glued blank from the cover shaping device.

The folding of the cover flaps and panels into final form proceeds as follows:

The blank whose body portion was squared and whose cover glue flaps are coated with adhesive is moved by the main conveyor 44 towards the point where the second conveyor 52 joins it. Near this point the cover shaping member 62 swings into a position alongside of, and in line with, a box body shaping member 61. The cover shaping member then moves within the reach of the sprocket wheel 117 whose vertical sprockets 116 engage the blank and force its main cover panel downwardly between the side members 118 and 119. This causes the cover side panels 29 and 30 to assume a substantially vertical position. Since, due to the initial folding of the cover flaps and panels of the rollers 103 and 106; the glue flaps 33 and 34 assumed a slanted position with respect to the cover side panels 29 and 30, the glue covered surfaces of the flaps clear the side portions 113 and move over the main panel 25. At this moment the projecting portion 131 of the pin 127 strikes the flat cam 132 and the plate 125 moves towards the cover front panel and erects it. The projection 126 on the plate holds down the cover front panel to prevent the main cover panel from rising.

As the conveyor advances, the roller 143 on the pressure pad base 136 moves against the leading plow 144 and causes the pressure pad 135 to swing down and press the glue flaps 33 and 34 into adhesive engagement with the main cover panel 25. The pressure is maintained for a time sufficient to permit the adhesive to set whereafter the roller moves onto the trailing plow 146 and the pressure pad assembly returns to its upright position.

At this time the squared and glued box has reached the end of the machine. The four conveyor chains 45, 46, 53 and 54 now curve around their respective gears at the end of the machine, the shaping member opens up, and the finished box drops out.

The invention thus provides an improved form of machine for squaring collapsed flat box blanks and forming and gluing a box cover integral with the box body. The squaring operation as well as the folding and gluing operations of the box body and the box cover are controlled by the advance of the conveyor which moves the blanks through the machine resulting in great accuracy of performance.

What is claimed is:

1. A machine for setting up into box shape a flat box blank having a body portion including box walls and box end panels, and a hinged cover portion including a main cover panel hinged to the body portion, a cover front panel, cover side panels, and glue flaps for securing said side panels to said main panel, the machine comprising, a machine base; a box body shaping member for engaging the box walls; a box cover shaping member hinged to the said body shaping member; a conveyor mounted on said machine base for jointly moving said two shaping members; a curved track on said base; means associated with said cover shaping member and engaging said track for moving said cover shaping member from an inclined position to a position substantially coplanar with said body shaping member; means on said base and driven in timed relationship with said conveyor for urging the cover portion of the blank against said cover shaping member; and a movable pressure pad cooperating with said cover shaping member for engaging said glue flaps to urge said glue flaps into surface-to-surface engagement with said main panel.

2. A machine for setting up into box shape a flat box blank having a body portion including box walls and box end panels, and a hinged cover portion including a main cover panel hinged to the body portion, a cover front panel, cover side panels, and glue flaps for securing said side panels to said main panel, the machine comprising, a machine base; a box body shaping member for engaging the box walls, said box body shaping member including a bottom portion and side portions, at least one of the side portions being tiltable with respect to the bottom portion; a box cover shaping member hinged to said body shaping member, said cover shaping member including a base portion adapted to receive the main cover panel, the base portion being hingedly connected to said bottom portion of the body shaping member, and side portions upright with respect to the base portion for guiding the side panels; a conveyor mounted on said machine base for jointly moving said two shaping members; a curved track on said base; means associated with said cover shaping member and engaging said track for moving said cover shaping member from an inclined position to a position substantially coplanar with said body shaping member; means on said base and driven in timed relationship with said conveyor for urging the cover portion of the blank against said cover shaping member; and a movable pressure pad cooperating with said cover shaping member for engaging said glue flaps to urge said glue flaps into surface-to-surface engagement with said main panel.

3. A machine for setting up into box shape a flat box blank having a body portion including box walls and box end panels, and a hinged cover portion including a main cover panel hinged to the body portion, a cover front panel, cover side panels, and glue flaps for securing said side panels to said main panel, the machine comprising, a machine base; a box body shaping member for engaging the box walls; a box cover shaping member hinged to the said body shaping member; a first conveyor mounted on said machine base for jointly moving said two shaping members; a curved track on said base; means associated with said cover shaping member and engaging said track for moving said cover shaping member from an inclined position to a position substantially coplanar with said body shaping member; means on said base driven in timed relationship with said conveyor for urging the cover portion of the blank against said cover shaping member; a second conveyor mounted on said machine base for movement parallel to said first conveyor; means for driving both conveyors at an equal linear rate of movement; a support mounted on said second conveyor substantially in line with said body and cover shaping members on said first conveyor; and a pressure pad movably mounted on said support for engaging said glue flaps to urge said glue flaps into surface-to-surface engagement with said main panel on said cover shaping member.

4. A machine for setting up into box shape a flat box blank having a body portion including box walls and box end panels, and a hinged cover portion including a main cover panel hinged to the body portion, a cover front panel, cover side panels, and glue flaps for securing said side panels to said main panel, the machine comprising, a machine base; a box body shaping member for engaging the box walls, said box body shaping member including a bottom portion and side portions, at least one of the side portions being tiltable with respect to the bottom portion; a box cover shaping member hinged to said body shaping member, said box cover shaping member including a base portion adapted to receive the main cover panel, the base portion being hingedly connected to said bottom portion of the body shaping member, and side portions upright with respect to the base portion for guiding the side panels; a first conveyor mounted on said machine base for jointly moving said two shaping members; a curved track on said base; means associated with said cover shaping member and engaging said track for moving said cover shaping member from an inclined position to a position substantially coplanar with said body shaping member; means on said base and driven in timed relationship with said conveyor for urging the cover portion of the blank against said cover shaping member; a second conveyor mounted on said machine base for movement parallel to said first conveyor; means for driving both conveyors at an equal linear rate of movement; a support mounted on said second conveyor substantially in line with said body and cover shaping members on said first conveyor; a movable front member mounted on said support adapted to engage said front panel for folding the front panel into set-up position; and a pressure pad movably mounted on said support for engaging said glue flaps to urge said glue flaps into surface-to-surface engagement with said main panel on said cover shaping member.

5. A machine for setting up into box shape a flat box blank having a body portion including box walls and box end panels, and a hinged cover portion including a main cover panel hinged to the body portion, a cover front panel, cover side panels, and glue flaps for securing said side panels to said main panel, the machine comprising, a machine base; two conveyors mounted on said machine base for movement along parallel paths; means for driving said conveyors equal linear speed; a box body shaping member having three angularly disposed portions adapted to engage the box body portion of the blank; a box cover shaping member having three angularly disposed portions adapted to engage the box cover portion of the blank, said cover shaping member being hingedly connected to said body shaping member and both members being mounted for transport by one conveyor; means for tilting said cover shaping member relatively to said body shaping member; means driven in timed relationship with respect to said conveyors for urging panels of the box cover into engagement with the angularly disposed portions of the cover shaping member; a support mounted on the other conveyor; a movable pressure pad mounted on said support; and means operable by the advance of said other conveyor relatively to the machine base for moving said pad towards said cover shaping member to urge the glue flaps into adhesive engagement with the main cover panel.

ROLLIN W. METTLER.

REFERENCES CITED

The following references are of record in the file of this patent:

UNITED STATES PATENTS

| Number | Name | Date |
|---|---|---|
| 1,275,759 | Russell | Aug. 13, 1918 |
| 1,378,579 | Bernotow | May 17, 1921 |
| 2,441,445 | Ringler et al. | May 11, 1948 |